(12) United States Patent
Hines

(10) Patent No.: US 12,367,907 B1
(45) Date of Patent: Jul. 22, 2025

(54) HOPSCOTCH SOUNDTRACK RECORDING AND PLAYBACK SYSTEM AND METHOD FOR A MOTION PICTURE FILM

(71) Applicant: Stephen P. Hines, Virginia Beach, VA (US)

(72) Inventor: Stephen P. Hines, Virginia Beach, VA (US)

( * ) Notice: Subject to any disclaimer, the term of this patent is extended or adjusted under 35 U.S.C. 154(b) by 0 days.

(21) Appl. No.: 18/605,960

(22) Filed: Mar. 15, 2024

(51) Int. Cl.
*G11B 20/02* (2006.01)

(52) U.S. Cl.
CPC .................................. *G11B 20/02* (2013.01)

(58) Field of Classification Search
CPC ....................................................... G11B 20/02
See application file for complete search history.

(56) References Cited

U.S. PATENT DOCUMENTS

| | | |
|---|---|---|
| 1,618,641 A | 2/1927 | De Forest |
| 1,835,743 A | 12/1931 | Aster |
| 3,012,105 A | 12/1961 | Bach |
| 3,243,376 A | 3/1966 | Lovick et al. |
| 3,502,398 A | 3/1970 | Michelson |
| 3,615,473 A | 10/1971 | Andreas |
| 3,644,683 A | 2/1972 | Braun |
| 3,689,692 A | 9/1972 | Chung-Sen Ih |
| 3,852,069 A | 12/1974 | Van Paesschen et al. |
| 3,891,444 A | 6/1975 | Van Paesschen et al. |
| 3,964,826 A | 6/1976 | Joseph et al. |
| 4,085,296 A | 4/1978 | Keegan |
| 4,124,784 A | 11/1978 | Johnson et al. |
| 4,215,920 A | 8/1980 | Butler |
| 4,355,383 A | 10/1982 | Dolby |
| 4,367,930 A | 1/1983 | Kolb, Jr. |
| 4,577,302 A | 3/1986 | Allen |
| 4,600,280 A | 7/1986 | Clark |
| 4,659,198 A | 4/1987 | Beauviala et al. |
| 4,679,183 A | 7/1987 | Staar |
| 4,893,921 A | 1/1990 | Beauviala |
| 5,155,510 A | 10/1992 | Beard |
| 5,164,574 A | 11/1992 | Ujiie et al. |
| 5,194,996 A | 3/1993 | Shores |
| 5,341,182 A | 8/1994 | Schmidt |
| 5,483,306 A | 1/1996 | Rodriguez |
| 5,523,996 A | 6/1996 | Kubota et al. |
| 5,543,868 A | 8/1996 | Tachi |

(Continued)

FOREIGN PATENT DOCUMENTS

| | | |
|---|---|---|
| EP | 0119829 A2 | 9/1984 |
| EP | 0666495 B1 | 8/1995 |
| FR | 2571513 A1 | 4/1986 |

*Primary Examiner* — Andrew Sasinowski
(74) *Attorney, Agent, or Firm* — Hanrahan Law Firm, P.A.; Benjamin M. Hanrahan, Esq.

(57) ABSTRACT

A hopscotch sound recording and playback system and method for a strip of motion picture film is presented herein. The system and method includes a sound recording assembly configured to record at least two soundtracks onto the strip of motion picture film, between film perforations, and in a laterally and longitudinally offset manner. The system and method also includes a sound playback assembly configured to read the at least two soundtracks by switching or hopscotching between the soundtracks to create an assembled soundtrack. The assembled soundtrack includes alternating sections from the two soundtracks disposed between the perforations on the film.

18 Claims, 7 Drawing Sheets

(56) References Cited

U.S. PATENT DOCUMENTS

| | | |
|---|---|---|
| 5,544,140 A | 8/1996 | Seagrave et al. |
| 5,587,749 A | 12/1996 | Goldberg et al. |
| 5,621,490 A | 4/1997 | Davis |
| 5,745,213 A | 4/1998 | Goodhill et al. |
| 2003/0043344 A1 | 3/2003 | Goodhill et al. |
| 2013/0030559 A1* | 1/2013 | Estes ................ G11B 20/02 700/94 |
| 2016/0125911 A1* | 5/2016 | Hoarty ................ G11B 11/20 369/4 |
| 2016/0295324 A1* | 10/2016 | Randall ............... G11B 27/031 |

* cited by examiner

HOPSCOTCH SOUNDTRACK RECORDING AND PLAYBACK SYSTEM AND METHOD FOR A MOTION PICTURE FILM

FIELD OF THE INVENTION

The present invention is generally directed to motion picture films, and more specifically, to a system and method for recording a soundtrack onto, and playing the soundtrack from, a strip of motion picture film. Certain embodiments are also directed to the strip of motion picture film with one or more soundtrack recordings disposed thereon.

BACKGROUND OF THE INVENTION

Film stock is an information storage medium upon which motions pictures (or animations) can be recorded using a camera or other recording equipment. After recording, the motion pictures can be played back using a movie projector or other like projecting equipment. The film stock is a strip of elongated plastic (or other material) base that is coated with a light-sensitive layer, which allows images to be recorded thereon.

Film perforations are holes (sometimes referenced as sprocket holes) that are perforated in the film stock during its manufacturing. The perforations are used by sprockets or claws to move the film stock through the camera and/or projector as the motion picture is being recorded (e.g., onto the film stock) or projected (e.g., from the strip of film containing the motion picture).

Film is classified or labelled according to the arrangement of the perforations, as well as other physical characteristics of the film, such as the width or gauge of the film. The gauge of the film may range from eight millimeters (8 mm) to seventy millimeters (70 mm) or more, while the perforations may vary in shape, size, pitch and positioning upon the film stock. More specifically, frame pitch is the measurement of the distance between a common point (e.g., the centers, top edges, etc.) of adjacently disposed or sequentially disposed perforations. The frame pitch can vary depending on the film dimensions (e.g., 8 mm, 35 mm, 70 mm).

A challenge often arises when adding a soundtrack to a strip of motion picture film alongside the frames of the motion picture. Oftentimes, a magnetic sound stripe is added to the film, for example, along a border (e.g., between the perforations and an outer longitudinal edge of the film, and/or between the motion picture frames and an outer longitudinal edge of the film). Adding a soundtrack to the film in this manner, e.g., when the film format is already established, usually has the effect of compromising the motion picture area (e.g., where the motion picture frames are recorded), which in turn compromises the picture area of the motion picture itself.

Accordingly, there is a need in the art for an improved system and method for recording soundtracks onto analog film stock without compromising the area of the image.

Specifically, the proposed system and method records (e.g., optically) soundtracks between the perforations, thereby eliminating the cost of a magnetic stripe. In this manner, the proposed system and method can use silent film (e.g., plain film without the additional cost of the magnetic stripe) and record the soundtrack thereon.

Furthermore, the proposed system and method will also allow for wider image formats to be disposed on the film stock itself, making use of the area(s) on the border often used for the magnetic stripe.

Additionally, advantageously, without the magnetic stripe, the film is thinner and can therefore be wound on a smaller spool, thereby reducing the overall physical size of the film cartridge and cameras used to record the motion picture and accompanying soundtrack.

SUMMARY OF THE INVENTION

Accordingly, the present invention is directed to a sound recording and playback system and method wherein at least two soundtracks are recorded between the perforations on a strip of motion picture film.

In particular, the system and method includes a sound recording assembly, for example, as part of a camera or other motion picture recording equipment, that includes a sound input device (e.g., a microphone) communicatively coupled with at least two sound recording heads.

A first one of the sound recording heads is configured to record a first soundtrack along the length of the film between the perforations; and a second one of the sound recording heads is configured to record a second soundtrack along the length of the film, also between the perforations, and in a parallel or side-by-side and a laterally and longitudinally offset relation to the first soundtrack.

Moreover, the monaural recording technique, as disclosed in accordance with at least one embodiment of the present invention, uses dual optical soundtracks laid down in the otherwise unused space between the perforations on the film. It should be noted, however, that in other embodiments, more than two soundtracks can be recorded onto or disposed on the film between the perforations. In addition, while several embodiments described herein utilize optically recorded or optically formatted soundtracks, in other embodiments, the soundtracks can be recorded or otherwise formatted magnetically, for example, if the film is coated with a magnetic coating between the perforations.

As just an example, the perforations in Super 8 film format, occupy only 27% of the frame pitch, leaving 73% of the area available to lay down or record soundtracks thereon. However, it should be noted that the various embodiments of the present invention can use any known film stock format, such as 35 mm, 8 mm, Super 8, etc., or any new film format or size.

The system and method further includes a sound playback assembly (e.g., as part of a movie projector assembly or other like equipment) that includes at least two sound playback heads.

A first one of the sound playback heads is positioned and configured to read the first soundtrack, and a second one of the sound playback heads is positioned and configured to read the second soundtrack.

Moreover, the soundtrack playback assembly of at least one embodiment is configured to create an assembled soundtrack that includes a plurality of successive sections, each of which are formed by alternating between the at least two sound playback heads. In this manner, certain embodiments of the present invention are directed to a hopscotch soundtrack recording and playback system and method. The term hopscotch is used herein to describe the alternating or back-and-forth aspects used to assemble the final or assembled soundtrack from the at least two laterally and longitudinally offset soundtracks disposed between the perforations.

BRIEF DESCRIPTION OF DRAWINGS

The following reference characters are used throughout this specification. Like reference numerals refer to like parts throughout the several views of the drawings provided herein.

Figure 1:
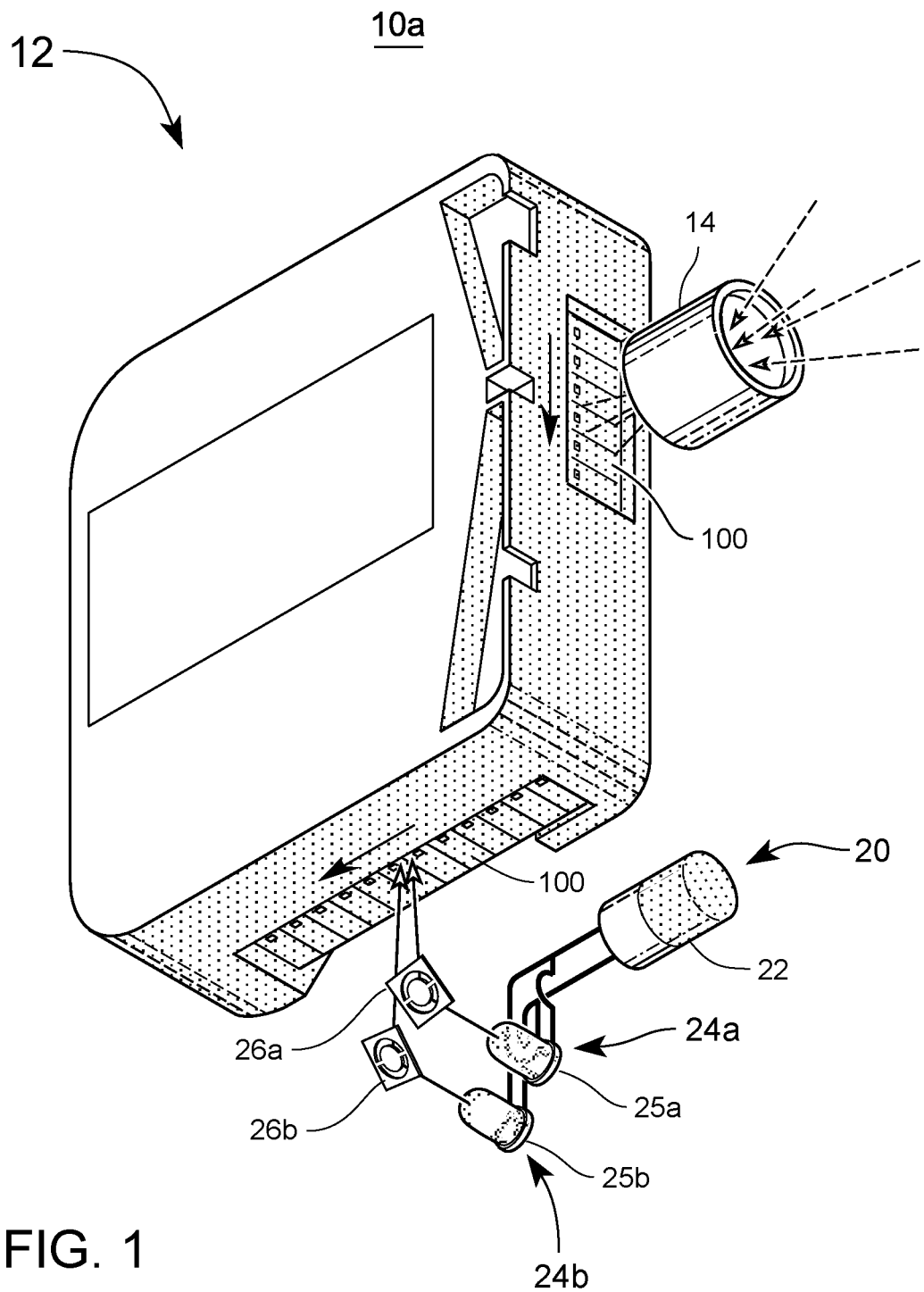
FIG. 1 is a perspective view of an exemplary camera with a sound recording assembly, as disclosed in accordance with at least one embodiment of the present invention.

10a system for recording one or more soundtracks on a strip of motion picture film
10b system for playing the one or more soundtracks from the strip of motion picture film
12 camera equipment
14 camera lens
16 projector
18 projector lens
19 film gate
20 sound recording assembly
22 sound input device
24a first sound recording head
24b second sound recording head
25a light source of first sound recording head
25b light source of second sound recording head
26a mirror of first sound recording head
26b mirror of second sound recording head
30 sound drum
32 light source
34 light source support
40 sound playback assembly
44a first sound playback head
44b second sound playback head
45a sensor of first sound playback head
45b sensor of second sound playback head
46a mirror of first sound playback head
46b mirror of second sound playback head
48 controller
50a first soundtrack
50b second soundtrack
55 assembled soundtrack
55a-g segments of assembled soundtrack
100 strip of motion picture film
102 frame
104, 104a-c perforation
W perforation width
C center of frame
P frame pitch
D offset distance
A1 arrow 1
A2 arrow 2
200 method
202-218 method steps

DETAILED DESCRIPTION OF THE INVENTION

As shown in the accompanying drawings, the present invention is directed to a system 10a for recording (FIGS. 1-3D) one or more soundtracks on a strip of motion picture film 100, a system 10b for playing (FIGS. 4-5C) the one or more soundtracks from the strip of motion picture film 100, a recording and playback method 200 (FIG. 6), and a strip of motion picture film 200 (FIGS. 5A-5C) with the soundtrack(s) disposed thereon.

More specifically, as provided above, film stock is an information storage medium upon which images, e.g., motion pictures, animations, etc. can be recorded using a camera 12 or other recording equipment. As shown in the embodiment of FIG. 1, the camera 12 includes a lens 14 or other component(s) configured to capture the video or motion of the film, and to record the motion onto the frames 102 of the film 100 (FIG. 2).

Furthermore, the camera 12, or other like equipment, also includes a sound recording assembly, generally referenced as 20, that is configured and structured to record, or to facilitate the recording of, soundtracks 50a, 50b onto a strip of motion picture film 100 (sometimes referred to as film 100) in accordance with at least one embodiment of the present invention. It should be noted that at least one embodiment includes the optical recording of one or more soundtracks onto the film stock, however, other sound recording techniques can be used and still fall within the spirit and scope of the present invention. For example, the soundtracks can be recorded or otherwise formatted magnetically if the film 100 is coated with a magnetic coating between the perforations 104.

Figure 2:
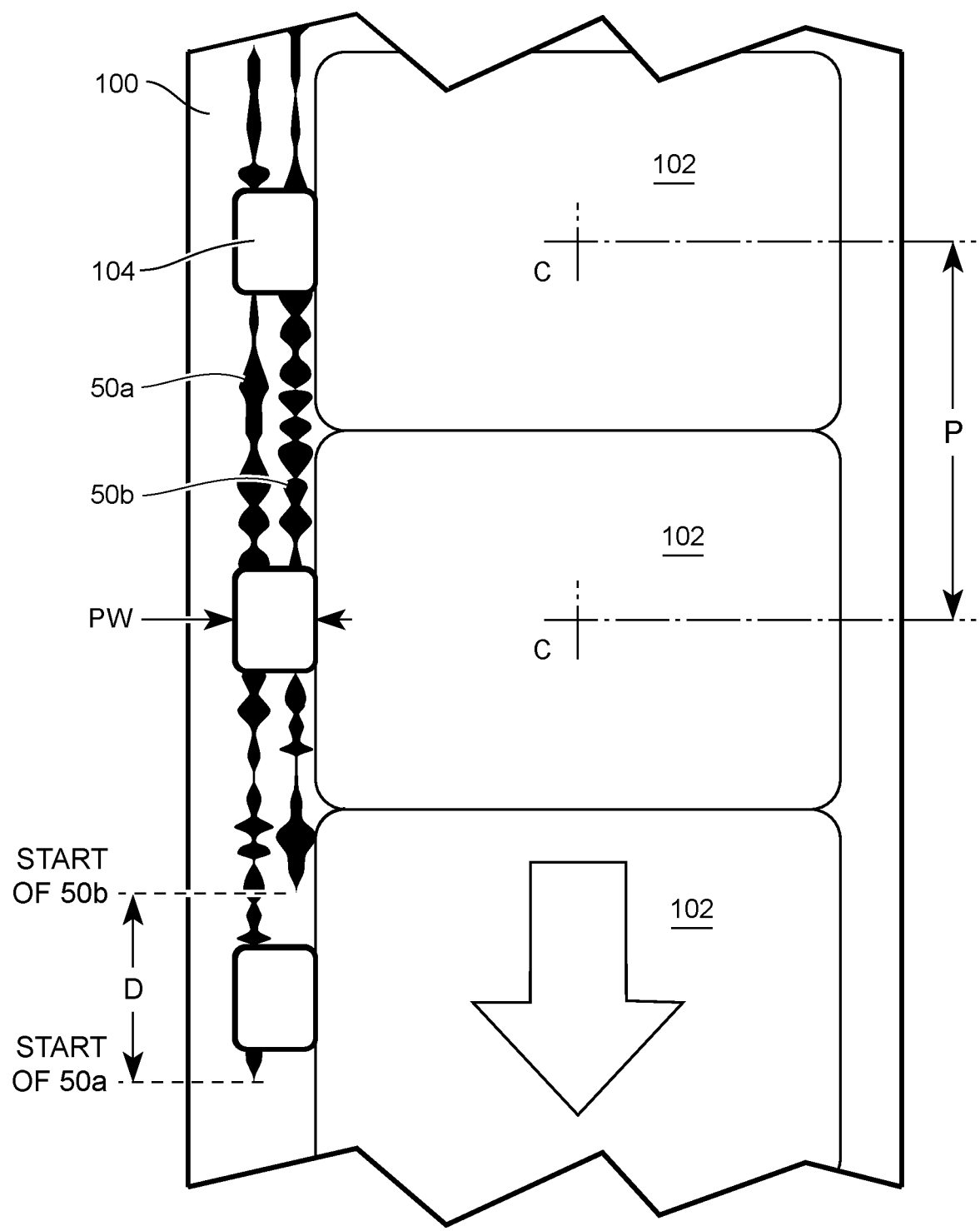
FIG. 2 is a schematic illustrating a portion of the strip of motion picture film with offset first and second soundtracks recorded between a plurality of perforations, as disclosed in accordance with at least one embodiment of the present invention.
Figure 3:
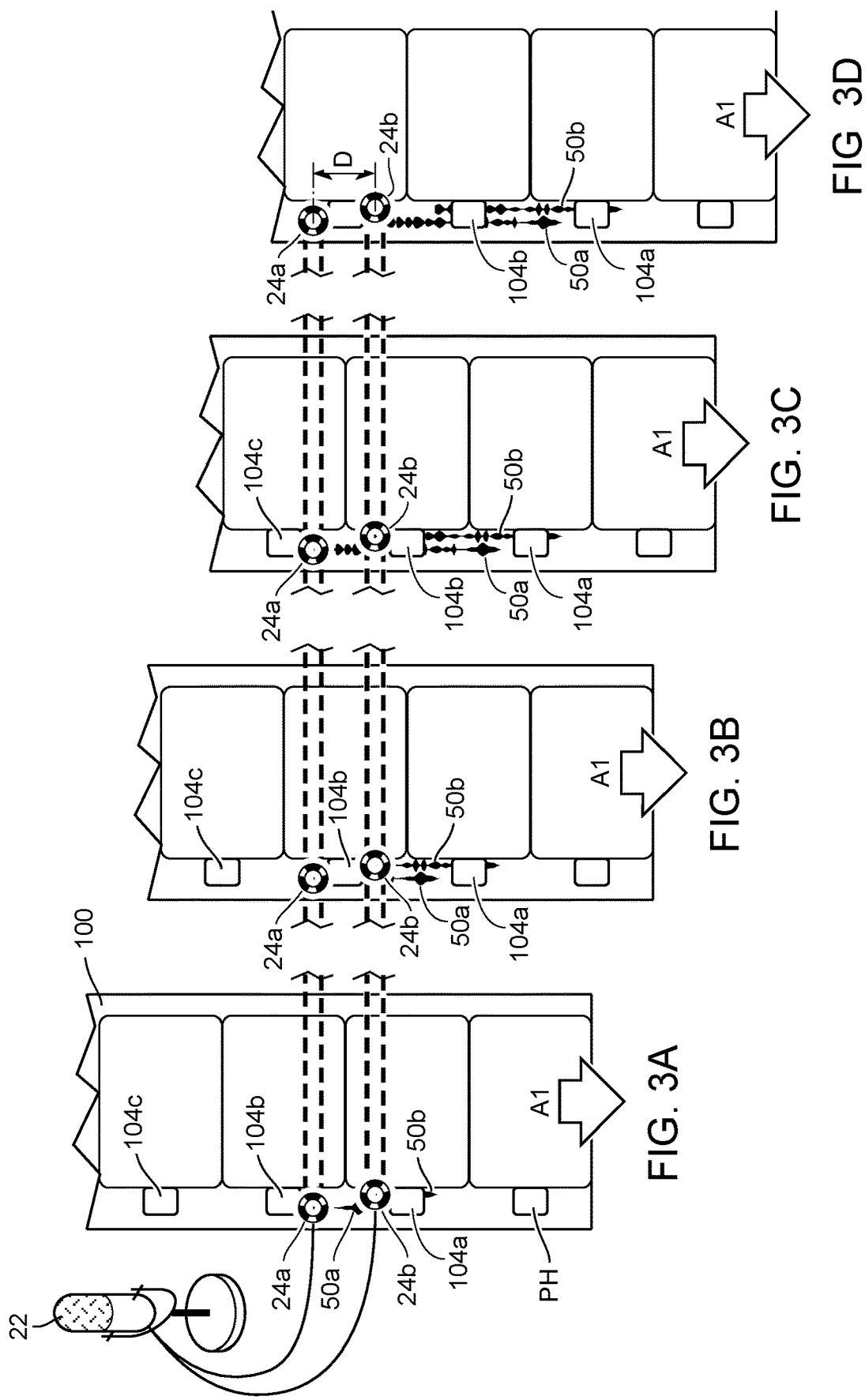
FIGS. 3A-3D collectively represent a timeline showing the strip of motion picture film moving in a downward direction while the offset sound recording heads record first and second soundtracks between the perforations, as disclosed in accordance with at least one embodiment of the present invention.

Specifically, still referring to FIG. 1, the sound recording assembly 20 of at least one embodiment includes a sound input device 22 communicatively coupled to one or more sound recording heads or sound recording devices, such as a first sound recording head 24a and a second sound recording head 24b. Each of the sound recording heads 24a, 24b will record a different one of the soundtracks 50a, 50b onto the film 100, as described herein. It should be noted that in some embodiments, more than two soundtracks, and therefore, more than two sound recording heads may be implemented and still fall within the full spirit and scope of the present invention.

In any case, the sound input device 22 of several embodiments of the present invention is a microphone, or a plurality of microphones, that can be integral with the camera, external to the camera and can communicate with the camera 12 and/or the sound recording assembly 20 thereof through a wired connection, wireless communication, or a combination.

Furthermore, the sound recording heads or sound recording devices 24a, 24b of the various embodiments of the present invention can include several different structures, formats and components configured to facilitate the optical (or other) recording of sound onto the film 100. As just an example, the sound recording heads 24a, 24b may each include a light source 25a, 25b, and one or more mirrors 26a, 26b. The mirror(s) 26a, 26b may operate by moving vertically and laterally or otherwise by vibrating in proportion to the volume of sound received from the input device 22 for optically recording the soundtrack pattern onto the film 100.

In other embodiments, however, the sound recording heads or devices 24a, 24b may include any other structures or components now known or later developed for facilitating the recording of the sound, including, but in no way limited to galvanometers, microelectronic mechanical systems (MEMS), etc.

With reference now to FIGS. 2 and 3A-3D, the first and second sound heads 24a, 24b are configured to each record a separate soundtrack, such as a first soundtrack 50a and a second soundtrack 50b, respectively, onto the film 100. Of note, as shown in FIG. 2, the first and second soundtracks 50a, 50b are recorded onto the film 100 between adjacent or successive perforations 104.

In addition, still referring to FIG. 2, the first and second soundtracks 50a, 50b of at least one embodiment are disposed or otherwise recorded in a side-by-side or parallel relation to one another between the adjacent or successive perforations 104.

Furthermore, with reference to FIGS. 3A-3D, the first and second sound recordings 50a, 50b of at least one embodiment are also recorded in a longitudinally offset relation to one another by a distance D. More specifically, FIGS. 3A-3D collectively represent a timeline while the film 100 moves in a direction represented by arrow A1 (e.g., a downward direction in the orientation of FIGS. 3A-3D).

In at least one embodiment, the two sound recording heads or devices 24a, 24b simultaneously receive the same audio from the sound input device 22 and simultaneously record the same soundtrack onto the film 100 in an offset (e.g., laterally offset and longitudinally offset) relation to one another. It should be noted, however, that since the soundtracks are recorded between but not over the perforations 104, the first soundtrack 50a and the second soundtrack 50b, as recorded onto the film 100, are not precisely identical, even though they receive an identical audio source. This is because of the offset recording of the two soundtracks and the positions of the perforations 104.

The longitudinal offset distance D between the first and second soundtrack recordings 50a, 50b is selected or determined such that collectively between the two soundtracks 50a, 50b, and taking into consideration the gaps in the soundtracks 50a, 50b created by the perforations 104, a continuous soundtrack can be assembled to match the audio input. In this manner, the soundtracks 50a, 50b are used to collectively represent the continuous audio input, such that, as described below, the soundtracks 50a, 50b can be assembled to form a lossless or continuous assembled soundtrack.

It should also be noted that the offset distance D of at least one embodiment may be equal to or approximately equal to one-half of the frame pitch P of the corresponding film 100. More specifically, the pitch P is a measurement of the distance between a common point (e.g., the centers, top edges, etc.) of adjacently disposed or sequentially disposed perforations. With reference to FIG. 2, for example, the P is measured between the center points C of adjacent frames 102.

Still referring to FIG. 2, in at least one embodiment, the two or more soundtracks 50a, 50b collectively fit entirely within a width W of the perforations 104. In other words, the collective width of the at least two side-by-side soundtracks 50a, 50b of at least one embodiment are equal to or less than the width W of the perforations 104 of the film 100.

Furthermore, in the embodiment shown in FIGS. 3A-3D, the sound recording heads 24a, 24b remain stationary (except for required vibrational movements in some cases) while the film 100 moves or travels past the sound recording heads 24a, 24b.

For example, in FIG. 3A, the bottom (or lower) end of perforation 104b is approaching the first sound recording head 24a (e.g., as the film 100 moves in direction A1), while the top (or upper) end of perforation 104a is moving away from the second sound recording head 24b. This means that as the first sound recording head 24a overlays or enters perforation 104b, the first sound recording head 24 will not be able to record the first soundtrack onto the film 100; however, the second sound recording head 24b will simultaneously overlay the film 100 between perforations 104a, 104b and will, therefore, record the second soundtrack 50b thereon. In other words, while the first sound recording head 24a overlays perforation 104b, the second sound recording head 24b overlays a portion of the film 100 between the perforations 104a, 104b. Consequently, while the first soundtrack 50a includes a gap at the perforations, the second soundtrack 50b will record onto the film 100 during the gap such that no audio is missed.

Turning to FIG. 3B, the bottom (or lower) end of perforation 104b is now approaching the second sound recording head 24b (e.g., as the film 100 moves in direction A1), while the top (or upper) end of perforation 104b is now moving away from the first sound recording head 24a. This means that as the second sound recording head 24b overlays or enters perforation 104b, the second sound recording head 24a will not be able to record the second soundtrack onto the film 100; however, the first sound recording head 24a will simultaneously overlay the film 100 between perforations 104b, 104c and will, therefore, record the first soundtrack 50a thereon. In other words, while the second sound recording head 24b overlays perforation 104b, the first sound recording head 24a overlays a portion of the film 100 between the perforations 104b, 104c. Consequently, while the second soundtrack 50b includes a gap at the perforations, the first soundtrack 50a will record onto the film 100 during the gap such that no audio is missed.

Similarly, as shown in FIG. 3C, the bottom (or lower) end of another perforation 104c is now approaching the first sound recording head 24a, while the top (or upper) end of perforation 104b is now moving away from the second sound recording head 24b. Again, as the first sound recording head 24a overlays or enters perforation 104c, the first sound recording head 24a will not be able to record the first soundtrack onto the film 100; however, the second sound recording head 24b will simultaneously overlay the film 100 between perforations 104b, 104c and will therefore record the second soundtrack 50b thereon.

FIG. 3D shows the bottom end of perforation 104c approaching the second sound recording head 24b, while the top end of perforation 104c is now moving away from the first sound recording head 24a, similar to FIG. 3B.

In other words, while the first sound recording head 24a overlays a perforation 104a-c, the second sound recording head 24b overlays a portion of the film 100 between the perforations 104a-c. Similarly, while the second sound recording head 24b overlays a perforation 104a-c, the first sound recording head 24a overlays a portion of the film 100 between the perforations 104a-c. Consequently, while one of the soundtracks 50a, 50b generates a gap at the perforations, the other soundtrack 50b, 50a (which receives an identical audio input) will be recorded onto the film 100 between adjacent perforations such that no audio is missed. Again, this is due to the longitudinally offset relation between the first and second soundtracks 50a, 50b.

In particular, still referring to FIGS. 3A-3D, it is shown that the sound recording heads 24a, 24b are longitudinally offset from one another a distance D that is equal to the longitudinal offset of the sound recordings 50a, 50b. This may be true in an embodiment where the sound recording heads 24a, 24b are perpendicular or orthogonal to the film 100 as the sound recordings take place. In other embodiments, however, it is contemplated that while the soundtracks 50a, 50b are longitudinally offset on the film 100, the sound recording heads 24a, 24b may or may not be offset.

Figure 4:
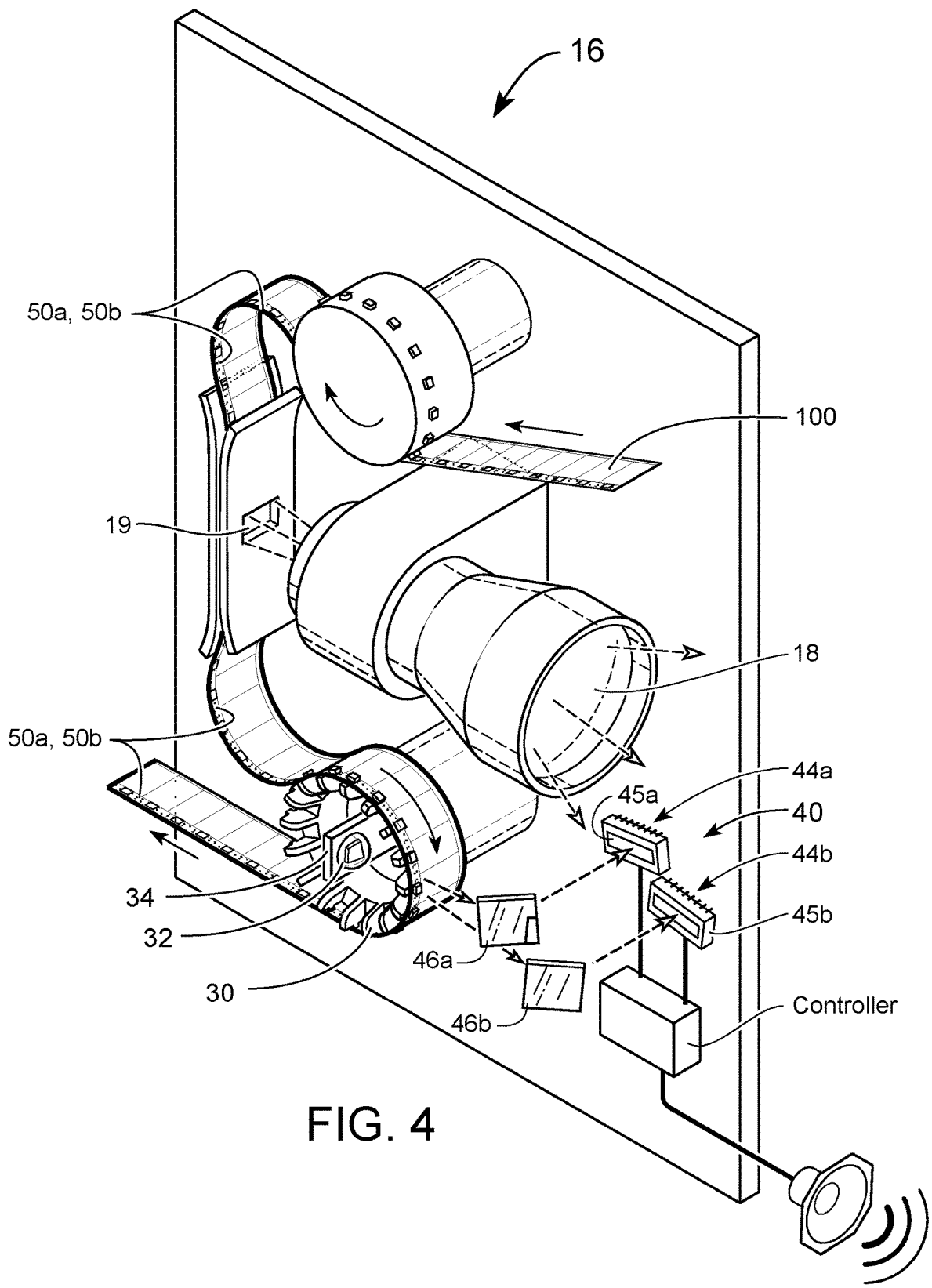
FIG. 4 is a perspective view of an exemplary projector with a sound playback assembly, as disclosed in accordance with at least one embodiment of the present invention.
Figure 5:
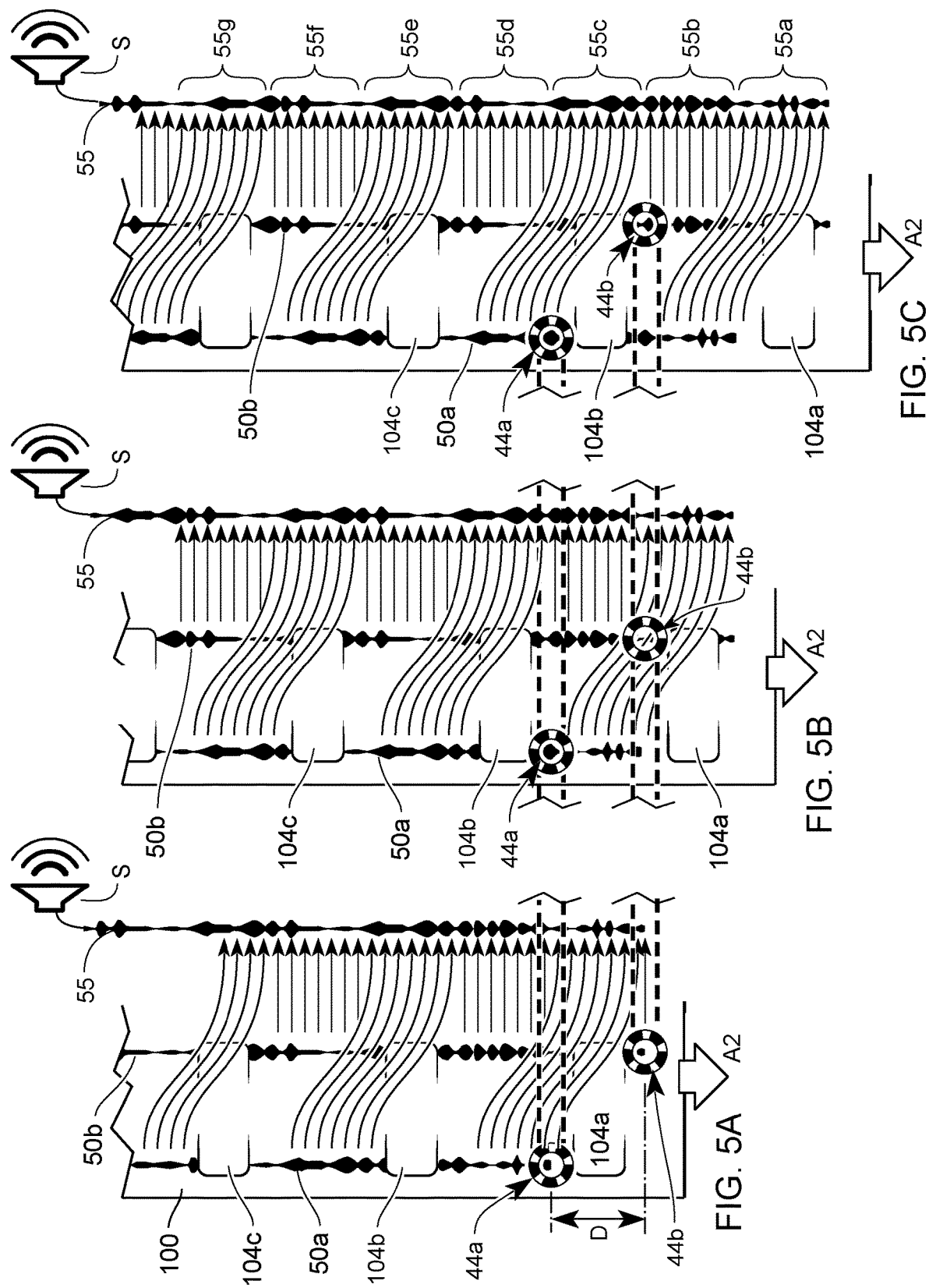
FIGS. 5A-5C collectively represent a timeline showing the strip of motion picture film moving in a downward direction while the offset sound playback heads read from the first and second soundtracks between the perforations, as disclosed in accordance with at least one embodiment of the present invention.

After recording the soundtracks 50a, 50b onto the film 100, the motion picture, and the corresponding audio, can be played back using a movie projector 16 or other like projecting equipment. As shown in the embodiment of FIG. 4, for example, the projector 16 includes a lens 18 or other component to display the motion picture portion of the film 100 as the film 100 moves through a film gate 19 and toward a sound drum 30. The sound drum 30 rotates as the film 100 also rotates and travels thereon. Disposed within the sound drum 30 is a light source 32 and a light source support 34. The light source 32, which may be any light source such as one or more light emitting diodes (LEDs), lasers, incandescent lights, etc., is configured to emit a light through the film 100 and toward a sound playback assembly 40.

In particular, the sound playback assembly 40 of at least one embodiment is configured and structured to read or playback, or otherwise facilitate the reading or playback of, soundtracks 50a, 50b from the strip of motion picture film 100.

Specifically, the sound playback assembly 40 of at least one embodiment includes one or more sound playback heads, such as a first sound playback head 44a and a second sound playback head 44b, that receive or read the audio soundtrack(s) from the film 100. For example, in at least one embodiment, a first sound playback head 44a may be positioned and structured to read or receive the first soundtrack 50a, while a second sound playback head 44b may be positioned and structured to read or receive the second soundtrack 50b.

It should be noted that in some embodiments, as described above, more than two soundtracks, and therefore, more than two sound recording heads, and more than two playback heads may be implemented and still fall within the full spirit and scope of the present invention. More specifically, in at least one embodiment, two or more recording heads may each record a separate soundtrack onto the film. In this manner, the number of soundtracks may match the number of sound recording heads. Similarly, two or more playback heads may each receive or read a separate or different one of the soundtracks. In this manner, the number of playback heads may match the number of soundtracks and recording heads.

Furthermore, the sound playback heads or sound playback devices 44a, 44b of the various embodiments of the present invention can include several different structures, formats and components configured to facilitate the reading or playback of soundtracks from the film 100. As just an example, the sound playback heads 44a, 44b may each include one or more sensors (e.g., linear photodetectors) 45a, 45b, and one or more mirrors 46a, 46b. The mirror(s) 46a, 46b are stationary and are used to reflect the image of the soundtracks 50a, 50b to the sensor(s) 46a, 46b.

In other embodiments, however, the sound playback heads or devices 44a, 44b may include any other structures or components now known or later developed for facilitating the playback of the soundtracks 50a, 50b.

Furthermore, in at least one embodiment, the first and second sound playback heads 44a, 44b are configured to read the first and second soundtracks 50a, 50b in a longitudinally offset by a distance D. For instance, as shown in FIGS. 5A-5C, the sound playback heads 44a, 44b are longitudinally offset from one another a distance D that is equal to the longitudinal offset D of the sound recordings 50a, 50b. Similarly, the sound recording heads 24a, 24b are longitudinally offset the same distance D, as shown in FIGS. 3A-3D.

In any event, FIGS. 5A-5C collectively represent a timeline while the film 100 moves in a direction represented by arrow A2 (e.g., a downward direction in the orientation of FIGS. 5A-5C).

The two sound playback heads or devices 44a, 44b of at least one embodiment are stationary while the film 100 moves in direction A2. It should be noted, however, that since no soundtrack is recorded over or in the perforations 104, the soundtrack playback assembly 40 alternates between the first and second playback heads 44a, 44b to create an assembled soundtrack 55. As schematically shown, the assembled soundtrack 55 is played through or otherwise transmitted to a sound or audio output device S, which may be in the form of a speaker, a plurality of speakers, or virtually any device(s) capable of playing the assembled soundtrack 55 and/or other audio or sound tracks.

For example, in FIG. 5A, the bottom (or lower) end of perforation 104a is approaching the second sound playback head 44b (e.g., as the film 100 moves in direction A2), while the top (or upper) end of perforation 104a is moving away from the first sound playback head 44a. As the second sound playback head 44b overlays or enters perforation 104a, the playback assembly 40 will switch to reading from the first sound playback head 44a. In other words, while the second sound playback head 44a overlays perforation 104a, the first sound playback head 44a overlays and reads the corresponding soundtrack from a portion of the film 100 between the perforations 104a, 104b. In this manner, the playback heads 44a, 44b, while stationary, are considered to 'hopscotch' or switch between the two soundtracks 50a, 50b.

Referring to FIG. 5B, the film 100 has moved in direction A2 relative to FIG. 5A, and the bottom (or lower) end of perforation 104a is now approaching the first sound playback head 44a, while the top (or upper) end of perforation 104a is moving away from the second sound playback head 44b. As the first sound playback head 44a overlays or enters perforation 104b, the playback assembly 40 will switch to reading from the second sound playback head 44b. In other words, while the first sound playback head 44b overlays perforation 104b, the second sound playback head 44b overlays and reads the corresponding soundtrack from a portion of the film 100 between the perforations 104a, 104b.

Similarly, in FIG. 5C, the bottom end of perforation 104b is now approaching the second sound playback head 44b, while the top end of perforation 104b is moving away from the first sound playback head 44a. As the second sound playback head 44b overlays or enters perforation 104b, the playback assembly 40 will switch again to reading from the first sound playback head 44a.

In this manner, the soundtrack playback assembly 40 creates an assembled soundtrack 55 that is composed of successive sections 55a-g, each of the sections 55a-g being formed by alternating or hopscotching between the two sound playback heads 44a, 44b. Specifically, FIGS. 5A-5C include several arrows extending between the first soundtrack 50a and the assembled soundtrack 55 and several arrows extending between the second soundtrack 50b and the assembled soundtrack 55.

For example, section 55a of the assembled soundtrack 55 is created using the first soundtrack 50a, as read by the first playback head 44a. The next successive section 55b of the assembled soundtrack 55 is created using the second soundtrack 50b, as read by the second playback head 44b. Next, section 55c of the assembled soundtrack 55 is created again using the first soundtrack 50a, as read by the first sound playback head 44a. The alternating between the soundtracks 50a, 50b using the corresponding sound playback heads 44a, 44b continues until the entire soundtrack 55 is assembled. In at least one embodiment, the assembled soundtrack 55 matches the initial audio input.

In this manner, the playback heads 44a, 44b, while stationary, are considered to 'hopscotch' or switch between the two soundtracks 50a, 50b. In particular, with reference again to FIG. 4, the playback assembly 40 of at least one embodiment also includes at least one controller, referenced as 48, which operatively controls the switching or hopscotching between the two playback heads 44a, 44b. The controller 48 may be a separate device or component, as schematically illustrated in FIG. 4, although in other embodiments, the controller 40 may comprise a series of devices or a plurality of devices that communicate with, and in some cases, at least partially control, the sensors 45a, 45n or the two playback heads 44a, 44b. In other cases, it is also contemplated that the controller(s) 40 or controlling mechanisms (e.g., circuitry or processor(s)) can be integrated with or part of each of the sensors 45a, 45b or playback heads 44a, 44b.

Figure 6:
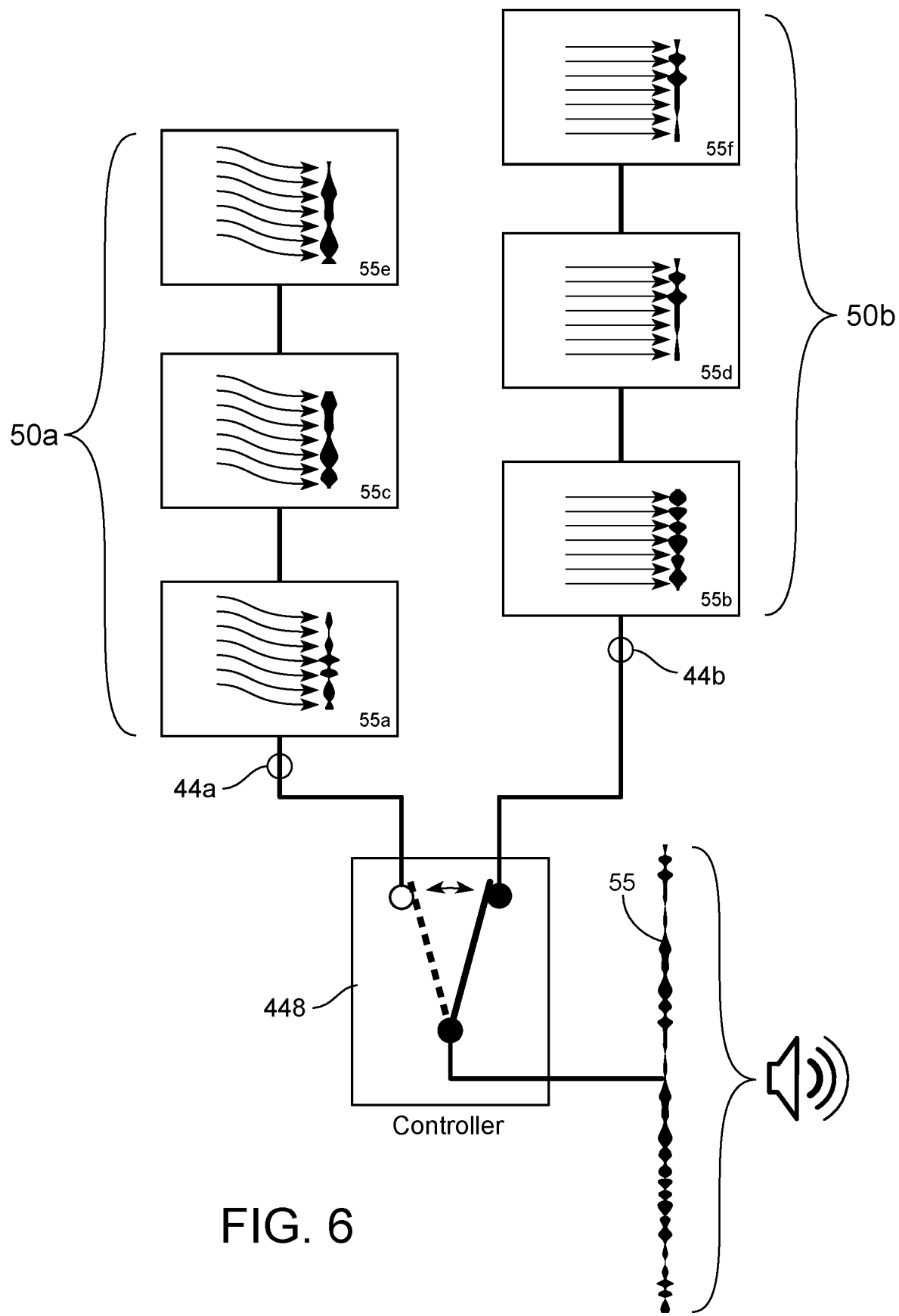
FIG. 6 is a schematic diagram illustrating the controller as disclosed in accordance with at least one embodiment of the present invention.

In particular, FIG. 6 shows a schematic representation of the controller 48 of at least one embodiment of the present invention and the conceptual functioning of the controller 48. Specifically, the controller 48 switches or hopscotches between the two playback heads 44a, 44b and/or between the two soundtracks 50a, 50b, to create the assembled soundtrack 55. For example, the controller 48 may first extract section 55a from soundtrack 50a, then (upon the approach of a perforation, as described herein) switch or hopscotch to extract section 55b from soundtrack 50b, then (upon the approach of another perforation, as described herein) again switch or hopscotch to extract section 55c from soundtrack 50a, etc. The switching or hopscotching will continue until the entire assembles soundtrack 55 is created.

Figure 7:
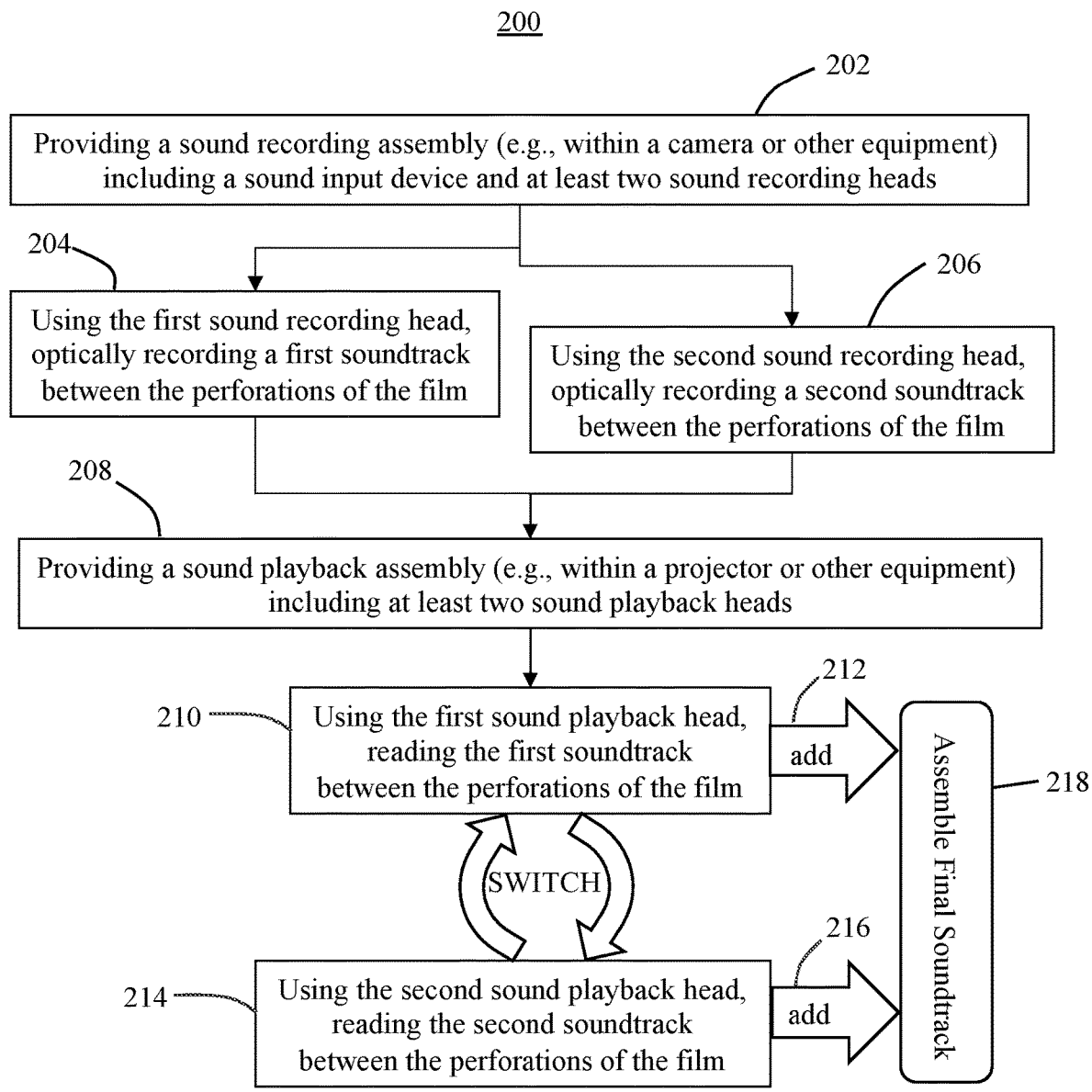
FIG. 7 is a high level flow chart illustrating the sound recording and playback method as described in accordance with at least one embodiment of the present invention.

With reference now to FIG. 7, at least one embodiment of the present invention also includes a hopscotch sound recording and playback method 200. More in particular, as referenced at 202, the method 200 includes providing a sound recording assembly 20, for example, within a camera 12 or other like equipment. The sound recording assembly 20 includes a sound input device (e.g., one or more microphones) and one or more, although in most embodiments, at least two sound recording heads 24a, 24b.

As shown at 204, using the first sound recording head 24a, the method 200 of at least one embodiment includes recording (e.g., optically) a first soundtrack between adjacent or successive perforations 104 on the film 100. Next, as shown at 206, using the second recording head 24b, the method 200 of at least one embodiment includes recording (e.g., optically) a second soundtrack between adjacent or successive perforations 104 on the film 100. As described herein, the first and second soundtracks 50a, 50b are laterally and longitudinally offset from one another.

Furthermore, still referring to FIG. 7, as shown at 208, the method 200 also includes providing a sound playback assembly 40, for example, within or as part of a projector or other like equipment. The sound playback assembly 40 includes one or more, although in most embodiments at least two sound playback heads 44a, 44b.

In particular, as shown at 210, using the first playback head 44a, the method 200 includes reading the first soundtrack between the perforations 104 of the film to create a section (e.g., section 55a) of an assembled soundtrack 55. As the film 100 moves relative to the playback heads 44a, 44b, the first playback head will approach a perforation 104. Prior to reaching a perforation, the method 200 with switch or hopscotch to the second soundtrack 50b. For example, as shown at 214, using the second sound playback head 44b, the method 200 includes reading the second soundtrack 50b between the perforations 104 of the film 100 to create another section (e.g., section 55b) of an assembled soundtrack 55.

The method 200 will continue to switch or hopscotch between soundtracks 50a, 50b, and adding the sections to the assembled soundtrack 55 (e.g., as shown at 212 and 216) until the full soundtrack 55 is assembled (e.g., as shown at 218), or in some cases, until the playback of the motion picture, animation or other film is stopped or paused.

As provided above with reference to FIGS. 4 and 6, in some embodiments a controller 48 is used to implement the switching or hopscotching effect of the various embodiments of the present invention. The controller 48 can therefore include one or more processors, microprocessors, circuitry, memory, etc. configured to control the sound playback heads 44a, 44b or otherwise configured to assemble the soundtrack 55, as described in accordance with the various embodiments of the present invention.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention. This written description provides an illustrative explanation and/or account of the present invention. It may be possible to deliver equivalent benefits using variations of the specific embodiments, without departing from the inventive concept. This description and these drawings, therefore, are to be regarded as illustrative and not restrictive.

The invention claimed is:

1. A sound recording and playback system for a strip of motion picture film, the strip of motion picture film comprising a plurality of perforations disposed in a spaced relation along a length of the strip of motion picture film, said system comprising:

a sound recording assembly configured to record at least two soundtracks onto the strip of motion picture film, said at least two soundtracks comprising a first soundtrack and a second soundtrack, said first soundtrack and said second soundtrack each being disposed between the plurality of perforations of the strip of motion picture film, wherein said second soundtrack is laterally and longitudinally offset from said first soundtrack, a sound playback assembly configured to read said first soundtrack and said second soundtrack and to create an assembled soundtrack therefrom, and wherein said assembled soundtrack comprises a plurality of successive sections, each of said plurality of successive sections formed by alternating between said at least two soundtracks.

2. The system as recited in claim 1 wherein said sound recording assembly comprises a sound input device communicatively coupled with at least two sound recording heads, said at least two sound recording heads comprising a first sound recording head and a second sound recording head.

3. The system as recited in claim 2 wherein said first sound recording head is configured to record said first soundtrack along the length of the strip of motion picture film between the plurality of perforations, and wherein said second sound recording head is configured to record said second soundtrack along the length of the strip of motion picture film between the plurality of perforations in a side-by-side and longitudinally offset relation to said first soundtrack.

4. The system as recited in claim 3 wherein said second sound recording head is disposed in a laterally and longitudinally offset manner relative to said first sound recording head.

5. The system as recited in claim 4 wherein said sound playback assembly comprises at least two sound playback heads, said at least two sound playback heads comprising a first sound playback head and a second sound playback head.

6. The system as recited in claim 5 wherein said first sound playback head is configured to read said first soundtrack, and wherein said second sound playback head is configured to read said second soundtrack.

7. The system as recite din claim 6 wherein said second sound playback head is disposed in a laterally and longitudinally offset manner relative to said first sound playback head.

8. The system as recited in claim 7 wherein said first sound recording head and said second sound recording head simultaneously receive an identical audio track from said sound input device.

9. The system as recited in claim 1 wherein said second soundtrack is longitudinally offset from said first soundtrack a distance of about one-half of a frame pitch.

10. The system as recited in claim 9 wherein said second sound recording head is longitudinally offset from said first sound recording head a distance of about one half of a frame pitch, and wherein said second sound playback head is longitudinally offset from said first sound playback head a distance of about one half of a frame pitch.

11. A sound recording and playback method for a strip of motion picture film, the strip of motion picture film comprising a plurality of perforations disposed in a spaced relation along a length of the strip of motion picture film, the method comprising:
  providing a sound recording assembly comprising a sound input device communicatively coupled with at least two sound recording heads, the at least two sound recording heads comprising a first sound recording head and a second sound recording head,
  recording, via the first sound recording head, a first soundtrack along the length of the strip of motion picture film between the plurality of perforations,
  recording, via the second sound recording head, a second soundtrack along the length of the strip of motion picture film between the plurality of perforations and in a side-by-side and longitudinally offset relation to the first soundtrack,
  providing a sound playback assembly comprising at least two sound playback heads, the at least two sound playback heads comprising a first sound playback head and a second sound playback head,
  reading, via the first sound playback head, the first soundtrack,
  reading, via the second sound playback head, the second soundtrack in a longitudinally offset manner relative to the reading of the first soundtrack,
  creating, via the sound playback assembly, an assembled soundtrack comprising a plurality of successive sections each formed by alternating between reading the first soundtrack and reading the second soundtrack.

12. The method as recited in claim 11 wherein the first sound recording head and the second sound recording head simultaneously receive an identical audio track from the sound input device.

13. The method as recited in claim 11 further comprising longitudinally offsetting the second sound recording head from the first sound recording head.

14. The method as recited in claim 11 further comprising defining the longitudinally offset relation between the second soundtrack and the first soundtrack as comprising about one-half of a frame pitch.

15. The method as recited in claim 11 further comprising longitudinally offsetting the second sound playback head from the first sound playback head.

16. A strip of motion picture film, comprising:
  a plurality of motion picture frame sections disposed along a length of said strip of motion picture film,
  a plurality of spaced perforations disposed along the length of the strip of motion picture film between said plurality of frame sections and at least one longitudinal edge of said strip of motion picture film,
  a first soundtrack recorded onto the strip of motion picture film between at least two of said plurality of perforations,
  a second soundtrack recorded onto the strip of motion picture film between said at least two of said plurality of perforations, and
  wherein said second soundtrack is disposed in a side-by-side and longitudinally offset position relative to said first soundtrack.

17. The strip of motion picture film as recited in claim 16 wherein said first soundtrack and said second soundtrack represent portions of a single continuous audio input.

18. The strip of motion picture film as recited in claim 17 wherein said first soundtrack and said second soundtrack alternately read to form an assembled soundtrack corresponding to said single continuous audio input.

\* \* \* \* \*